United States Patent
Shinba et al.

(10) Patent No.: US 10,641,416 B2
(45) Date of Patent: May 5, 2020

(54) FIXING CABLE TIE (71) Applicant: KYOCERA Document Solutions Inc., Osaka (JP)

(72) Inventors: Minoru Shinba, Osaka (JP); Yuichi Sugiyama, Osaka (JP); Masanori Kyogoku, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/295,416

(22) Filed: Mar. 7, 2019

(65) Prior Publication Data
US 2019/0277429 A1 Sep. 12, 2019

(30) Foreign Application Priority Data
Mar. 12, 2018 (JP) .................................. 2018-044104

(51) Int. Cl.
*F16L 3/137* (2006.01)
*F16L 3/233* (2006.01)

(52) U.S. Cl.
CPC ............... *F16L 3/137* (2013.01); *F16L 3/233* (2013.01)

(58) Field of Classification Search
CPC ......... F16L 3/137; F16L 3/233; F16L 3/2336; Y10T 24/1498; Y10T 24/141; H02G 3/30; H02G 3/32; B60R 16/0215
See application file for complete search history.

(56) References Cited

U.S. PATENT DOCUMENTS

| | | | | | |
|---|---|---|---|---|---|
| 3,463,427 | A | * | 8/1969 | Fisher | F16L 3/2332 248/68.1 |
| 3,588,011 | A | * | 6/1971 | Pere | F16L 3/12 248/68.1 |
| 4,705,245 | A | * | 11/1987 | Osada | F16L 3/233 24/16 PB |
| 4,735,387 | A | * | 4/1988 | Hirano | F16L 3/233 24/16 PB |
| 4,944,475 | A | * | 7/1990 | Ono | F16L 3/233 24/16 PB |
| 5,337,983 | A | * | 8/1994 | Mailey | F16L 3/137 248/68.1 |
| 5,730,399 | A | * | 3/1998 | Baginski | H02G 3/263 24/16 PB |
| 5,966,781 | A | * | 10/1999 | Geiger | F16L 3/137 24/16 PB |
| 6,119,314 | A | * | 9/2000 | Freed | B65D 63/1063 24/16 PB |
| 6,196,751 | B1 | * | 3/2001 | Khokhar | F16D 1/08 403/3 |

(Continued)

FOREIGN PATENT DOCUMENTS

JP  2006-246663 A  9/2006

*Primary Examiner* — Robert Sandy
*Assistant Examiner* — Rowland Do
(74) *Attorney, Agent, or Firm* — Studebaker & Brackett PC (57) ABSTRACT

A fixing cable tie binds electric cables and fixes the electric cables to a mounting plate. The fixing cable tie includes a pair of elastic pieces and a pair of cable ties. The elastic pieces serve as a locking section for fixing the electric cables to the mounting plate, and elastically deform inward by external urging to shrink in diameter. The pair of cable ties binds the electric cables. The pair of cable ties (first cable tie section and second cable tie section) is joined respectively to the pair of elastic pieces.

8 Claims, 5 Drawing Sheets

(56) References Cited

U.S. PATENT DOCUMENTS

| | | | | |
|---|---|---|---|---|
| 6,240,602 B1* | 6/2001 | Geiger | ................... | F16L 3/137 24/16 PB |
| 6,533,226 B2* | 3/2003 | Geiger | ................... | F16L 3/233 248/68.1 |
| 6,718,597 B2* | 4/2004 | Geiger | .............. | B65D 63/1072 24/16 PB |
| 7,229,052 B2* | 6/2007 | Takeuchi | .............. | F16B 21/088 24/16 PB |
| 7,360,744 B2* | 4/2008 | Kwilosz | ................. | F16L 3/137 248/68.1 |
| 7,437,804 B1* | 10/2008 | Geiger | .............. | B65D 63/1072 24/16 PB |
| 7,789,414 B2* | 9/2010 | Blackburn | ............ | B60R 21/213 24/16 PB |
| 2001/0010349 A1* | 8/2001 | Sakakura | .................. | F16L 3/23 248/68.1 |
| 2003/0189140 A1* | 10/2003 | Takeuchi | .............. | F16B 21/084 248/71 |
| 2007/0023586 A1* | 2/2007 | Geiger | ................ | B60R 16/0215 248/71 |
| 2007/0272807 A1* | 11/2007 | Takagaki | .............. | F16B 21/086 248/71 |
| 2013/0193279 A1* | 8/2013 | Tanaka | ................. | F16B 21/086 248/74.3 |
| 2017/0210527 A1* | 7/2017 | Breeling | ............ | B65D 63/1063 |

* cited by examiner

FIXING CABLE TIE

INCORPORATION BY REFERENCE

The present application claims priority under 35 U.S.C. § 119 to Japanese Patent Application No. 2018-044104, filed on Mar. 12, 2018. The contents of this application are incorporated herein by reference in their entirety.

BACKGROUND

The present disclosure relates to a fixing cable tie which fixes bound electric cables to a mounting plate.

Several electric cables are used inside of an image forming apparatus such as a copier, a multifunction peripheral, or a printer. A cable tie is used to control spreading of the electric cables. When the bound electric cables are fixed to a mounting plate such as a resin guide or a metal plate (chassis), a fixing cable tie including a locking section is used.

SUMMARY

A fixing cable tie according to an aspect of the present disclosure is for binding electric cables and fixing the electric cables to a mounting plate. The fixing cable tie includes a pair of elastic pieces and a pair of cable ties. The elastic pieces serve as a locking section for fixing the electric cable to the mounting plate. The elastic pieces elastically deform inward by external urging (urging force received from outside) to shrink in diameter. The cable ties are joined respectively to the pair of elastic pieces.

DETAILED DESCRIPTION

The following describes embodiments of the present disclosure in detail with reference to the accompanying drawings. Note that in the following embodiments, components having similar functions are labelled with the same reference signs.

First Embodiment

Figure 1A:
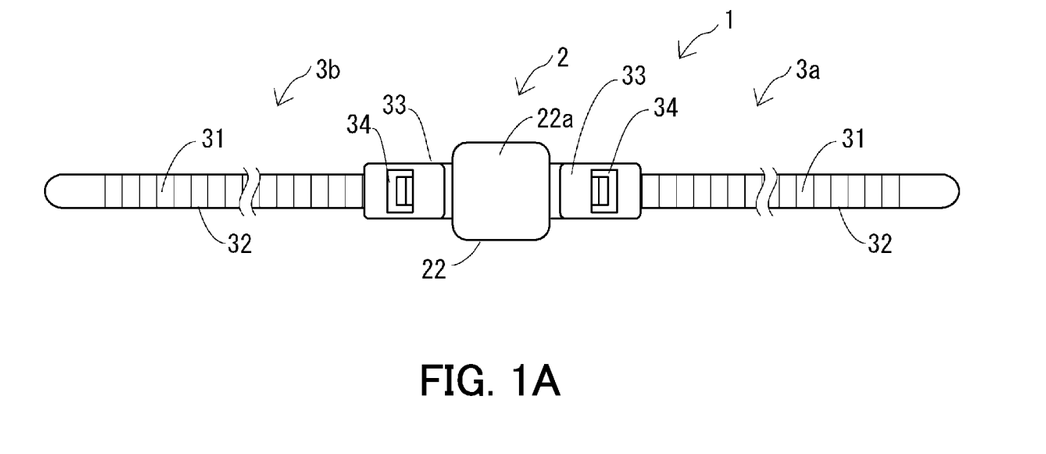
FIG. 1A is a plan view of a general configuration of a first embodiment of a fixing cable tie according to the present disclosure.
Figure 1B:
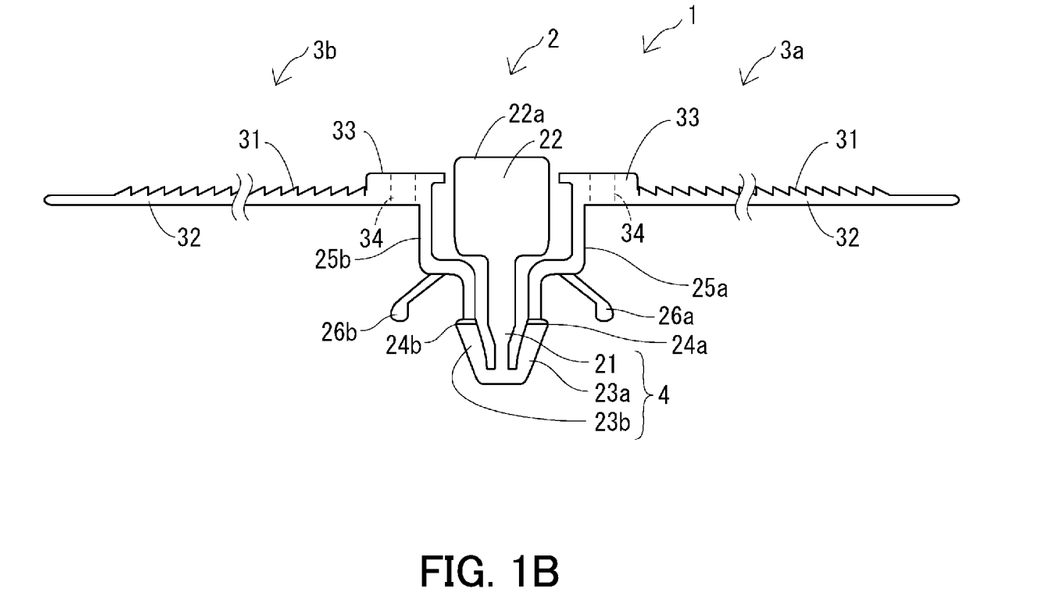
FIG. 1B is a front view of the general configuration of the first embodiment of the fixing cable tie according to the present disclosure.

The following describes a fixing cable tie 1 according to a first embodiment with reference to FIGS. 1A, 1B, 2A, and 2B. As illustrated in FIGS. 1A and 1B, the fixing cable tie 1 according to the first embodiment includes a fixing section 2, a first cable tie section 3a, and a second cable tie section 3b. In other words, the fixing cable tie 1 includes the fixing section 2 and a pair of cable tie sections 3a and 3b. The fixing section 2 is integrated with the first cable tie section 3a and the second cable tie section 3b by a resin mold. FIG. 1A is a plan view of the fixing cable tie 1. FIG. 1B is a front view of the fixing cable tie 1.

The fixing section 2 includes a shaft section 21, a pushing piece 22 formed on an upper portion of the shaft section 21, a pair of elastic pieces 23a and 23b, and a pair of joining pieces 25a and 25b. The elastic pieces 23a and 23b are joined to the shaft section 21 so as to be elastically deformable on a lower portion of the shaft section 21. The shaft section 21 and the elastic pieces 23a and 23b function as a locking section 4 for fixing to a mounting plate such as a resin guide or a metal plate (chassis). A cross-sectional shape of the locking section 4 is set according to a shape of a mounting hole formed in the mounting plate.

The elastic pieces 23a and 23b are arranged so as to flank the shaft section 21 from both sides with a space therebetween. The elastic piece 23a and the elastic piece 23b, or rather the pair of elastic pieces 23a and 23b, are connected. The elastic pieces 23a and 23b elastically deform inward (toward the shaft section 21) by external urging (urging force received from outside of the elastic pieces 23a and 23b). Step sections 24a and 24b are formed respectively on outer surfaces of the elastic pieces 23a and 23b. That is, the elastic pieces 23a and 23b respectively include the step sections 24a and 24b. The step section 24a is formed at an end of the elastic piece 23a, and the step section 24b is formed at an end of the elastic piece 23b. The cross-sectional shape of the locking section 4 gradually expands in diameter from a lower portion and shrinks in diameter at the step sections 24a and 24b.

The pushing piece 22 functions as an operation section for pushing and fixing the locking section 4 into the mounting hole formed in the mounting plate. An upper surface of the pushing piece 22 is formed as a pushing surface 22a perpendicular to the shaft section 21.

The joining piece 25a joins the first cable tie section 3a and the elastic piece 23a. The joining piece 25b joins the second cable tie section 3b and the elastic piece 23b. The joining piece 25a to which the first cable tie section 3a is joined is extended upward from the end of the elastic piece 23a. Specifically, the joining piece 25a is extended from the end of the elastic piece 23a, in a direction away from a point of contact between the elastic piece 23a and the elastic piece 23b. The joining piece 25b to which the second cable tie section 3b is joined is extended upward from the end of the elastic piece 23b. Specifically, the joining piece 25b is extended from the end of the elastic piece 23b, in the direction away from the point of contact between the elastic piece 23a and the elastic piece 23b. The joining pieces 25a and 25b are arranged so as to flank the shaft section 21 and the pushing piece 22 from both sides with a space therebetween. The joining piece 25a joins the first cable tie section 3a and the elastic piece 23a. The joining piece 25b joins the second cable tie section 3b and the elastic piece 23b.

Contact pieces 26a and 26b extended diagonally downward and outward relative to the pushing piece 22 are respectively formed on the joining pieces 25a and 25b. The contact pieces 26a and 26b are elastic. The contact pieces 26a and 26b are elastically brought into contact with an obverse surface of the mounting plate in a state where the locking section 4 is mounted to the mounting plate.

Figure 2A:
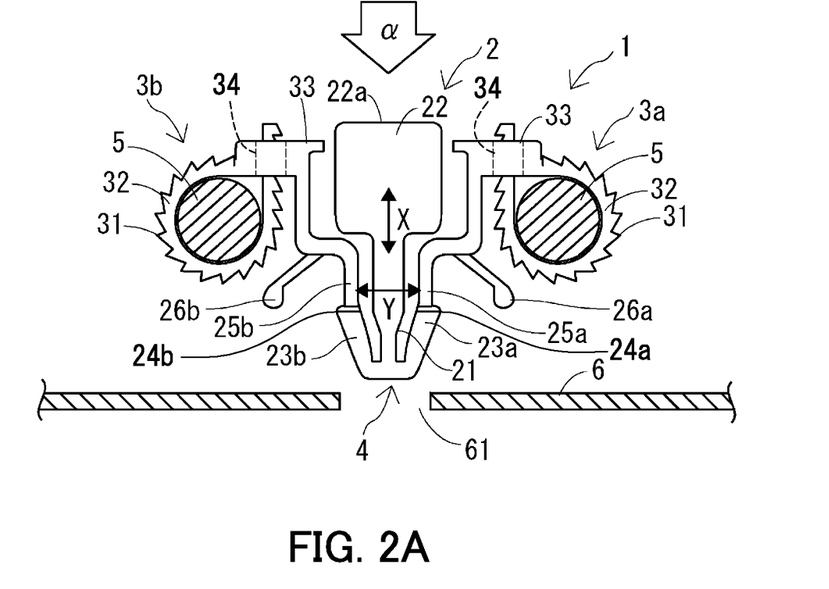
FIGS. 2A and 2B are descriptive diagrams of an attachment/detachment operation of the fixing cable tie illustrated in FIGS. 1A and 1B to and from a mounting plate.
Figure 2B:
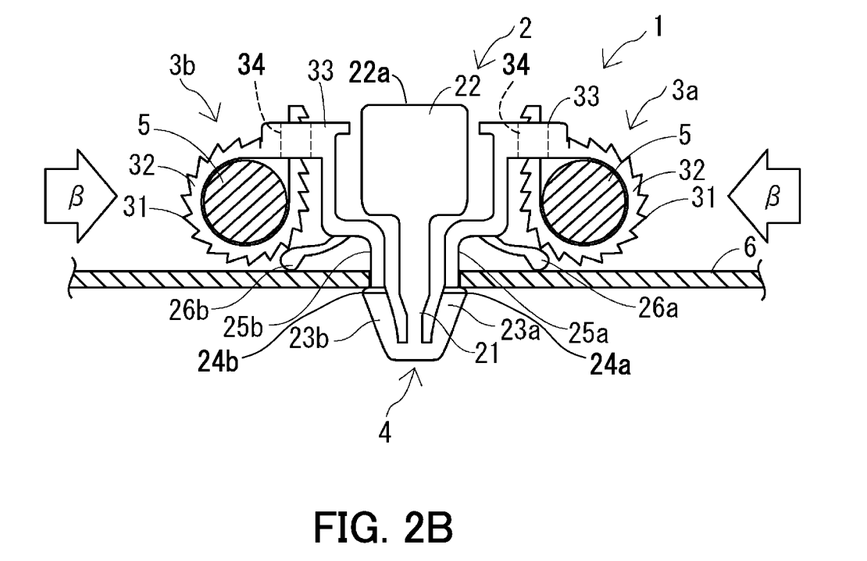

FIGS. 2A and 2B are descriptive diagrams of an attachment/detachment operation of the fixing cable tie illustrated in FIGS. 1A and 1B to a mounting plate 6. The first cable tie section 3a and the second cable tie section 3b each have a known structure including a tie 32 and a head section 33. Serration-like engagement grooves 31 are formed on the ties 32. The head sections 33 lock the ties 32 that have been inserted through openings 34. The first cable tie section 3a and the second cable tie section 3b are joined respectively to ends of the joining pieces 25a and 25b as illustrated in FIGS. 2A and 2B. Specifically, the head sections 33 are joined one each to the ends of the joining pieces 25a and 25b. A wiring direction of bound electric cable bundles 5 is orthogonal to an axial direction X of the shaft section 21 and a direction Y in which the elastic pieces 23a and 23b elastically deform. The head sections 33 of the first cable tie section 3a and the second cable tie section 3b are joined respectively to the ends of the joining pieces 25a and 25b in a direction orthogonal to the axial direction X and the direction Y. The electric cable bundles 5 include one or more electric cables. The pair of cable tie sections 3a and 3b binds the electric cable bundles 5.

According to the present embodiment, the head sections 33 of the first cable tie section 3a and the second cable tie section 3b are joined respectively to the joining pieces 25a and 25b such that the openings 34 through which the ties 32 are inserted are parallel to the axial direction X of the shaft section 21. The ties 32 are locked by being inserted upward through the openings 34 of the head sections 33 from beneath the openings 34. The engagement grooves 31 of the ties 32 are formed on outer surfaces that do not make contact with the bound electric cable bundles 5.

The joining pieces 25a and 25b to which the head sections 33 of the first cable tie section 3a and the second cable tie section 3b are respectively joined are arranged so as to flank the pushing piece 22 from both sides with a space therebetween. Accordingly, the electric cable bundles 5 bound by the first cable tie section 3a and the second cable tie section 3b are also arranged so as to flank the pushing piece 22 from both sides. Accordingly, the pushing surface 22a of the pushing piece 22 is not covered by the electric cable bundles 5 and is disengaged.

Accordingly, when the fixing cable tie 1 is fixed to the mounting plate 6 in a state where the electric cable bundles 5 are bound respectively by the first cable tie section 3a and the second cable tie section 3b as illustrated in FIG. 2A, the pushing surface 22a is pushed in the axial direction X of the shaft section 21 indicated by an arrow a. As a result, the locking section 4 can be easily pushed into a fixing hole 61 formed in the mounting plate 6.

By pushing the locking section 4 into the fixing hole 61, the pair of elastic pieces 23a and 23b elastically deform inward to shrink in diameter. That is, the elastic pieces 23a and 23b elastically deform toward the shaft section 21. As a result, the elastic pieces 23a and 23b are inserted into the fixing hole 61. As illustrated in FIG. 2B, the elastic pieces 23a and 23b are restored and expand in diameter upon the step sections 24a and 24b of the respective elastic pieces 23a and 23b penetrating the fixing hole 61. As a result, the locking section 4 engages with the mounting plate 6 by pinching the mounting plate 6 between the step sections 24a and 24b and the contact pieces 26a and 26b, and thus the fixing cable tie 1 is fixed.

When the fixing cable tie 1 fixed to the mounting plate 6 is detached from the mounting plate 6, the electric cable bundles 5 bound by the first cable tie section 3a and the second cable tie section 3b are pushed in directions indicated by arrows (3 as illustrated in FIG. 2B. That is, the electric cable bundles 5 are pushed toward the pushing piece 22. Therefore, the elastic pieces 23a and 23b elastically deform inward to shrink in diameter through the joining pieces 25a and 25b. That is, the elastic pieces 23a and 23b elastically deform toward the shaft section 21. As a result, the locking section 4 can be easily detached from the fixing hole 61.

Second Embodiment

Figure 3:
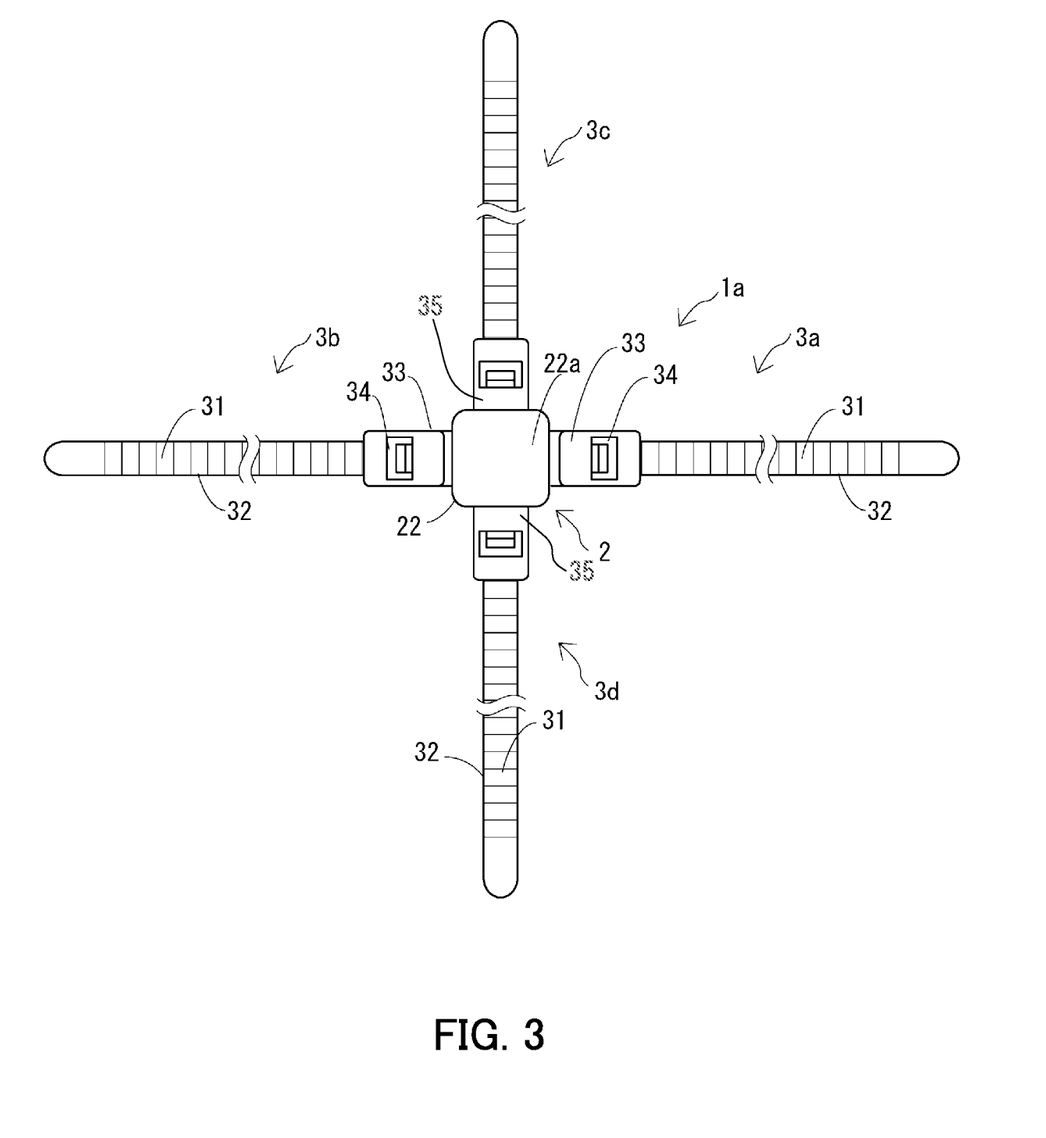
FIG. 3 is a plan view of a general configuration of a second embodiment of a fixing cable tie according to the present disclosure.

The following describes a fixing cable tie 1a according to a second embodiment with reference to FIG. 3. FIG. 3 is a plan view of a general configuration of the second embodiment of the fixing cable tie 1a. Referring to FIG. 3, the fixing cable tie 1a according to the second embodiment further includes a third cable tie section 3c and a fourth cable tie section 3d in addition to the fixing cable tie 1 according to the first embodiment illustrated in FIG. 1A. Specifically, head sections 35 of the third cable tie section 3c and the fourth cable tie section 3d are joined to side surfaces of the pushing piece 22 in addition to the configuration of the fixing cable tie 1 according to the first embodiment. The third cable tie section 3c and the fourth cable tie section 3d each have a known structure similar to that of the first cable tie section 3a and the second cable tie section 3b. Note that the number of cable tie sections joined to the pushing piece 22 is not limited, and may be one or three or more.

In the example illustrated in FIG. 3, the third cable tie section 3c and the fourth cable tie section 3d are joined to the pushing piece 22 in a direction orthogonal to the first cable tie section 3a and the second cable tie section 3b. In addition, the first and second cable tie sections 3a and 3b and the third and fourth cable tie sections 3c and 3d are preferably set in directions according to respective directions of intersecting electric cable bundles 5. Therefore, the electric cable bundles 5 can be easily bound and fixed at a point where the electric cable bundles 5 intersect.

Third Embodiment

Figure 4A:
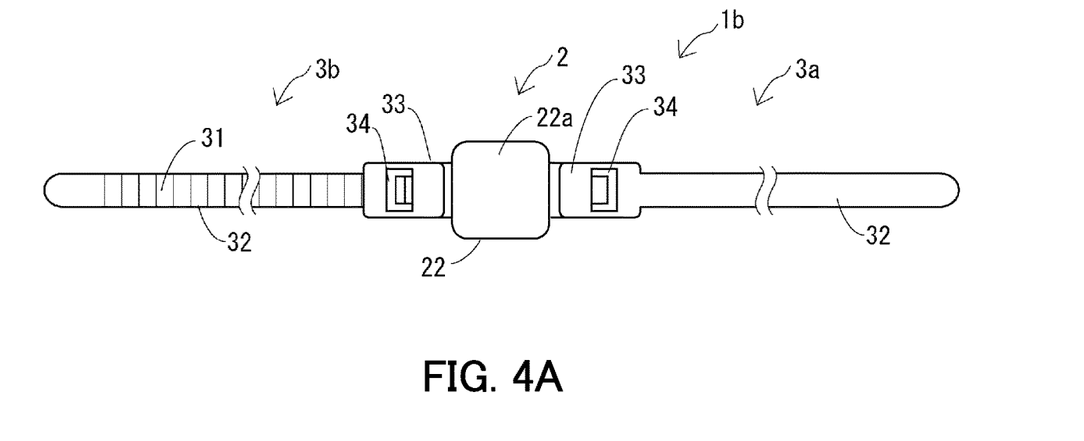
FIG. 4A is a plan view of a general configuration of a third embodiment of a fixing cable tie according to the present disclosure.
Figure 4B:
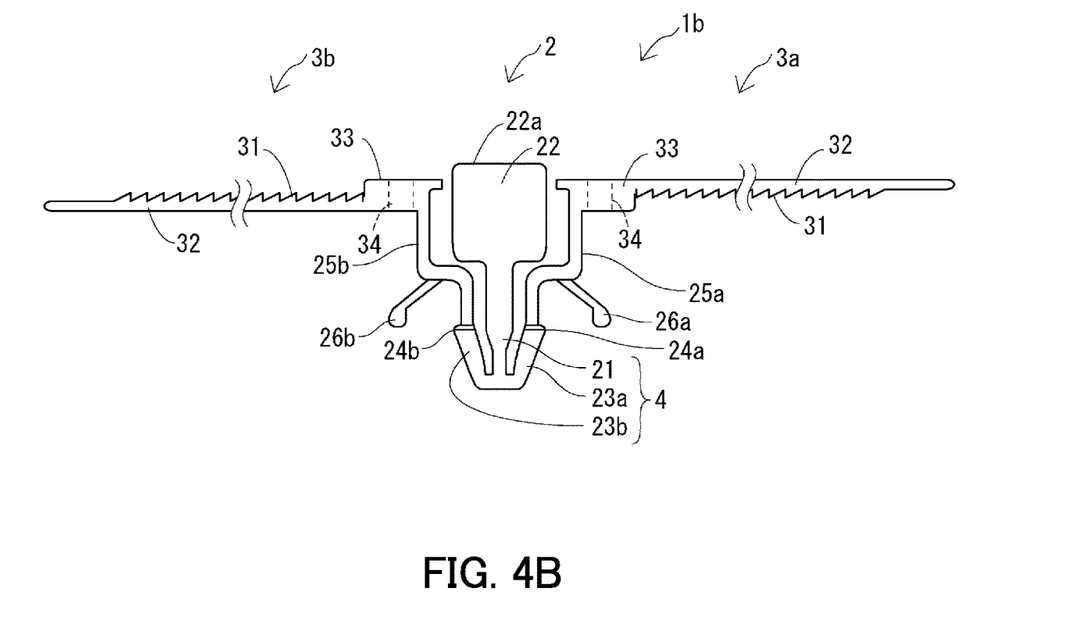
FIG. 4B is a front view of the general configuration of the third embodiment of the fixing cable tie according to the present disclosure.
Figure 5:
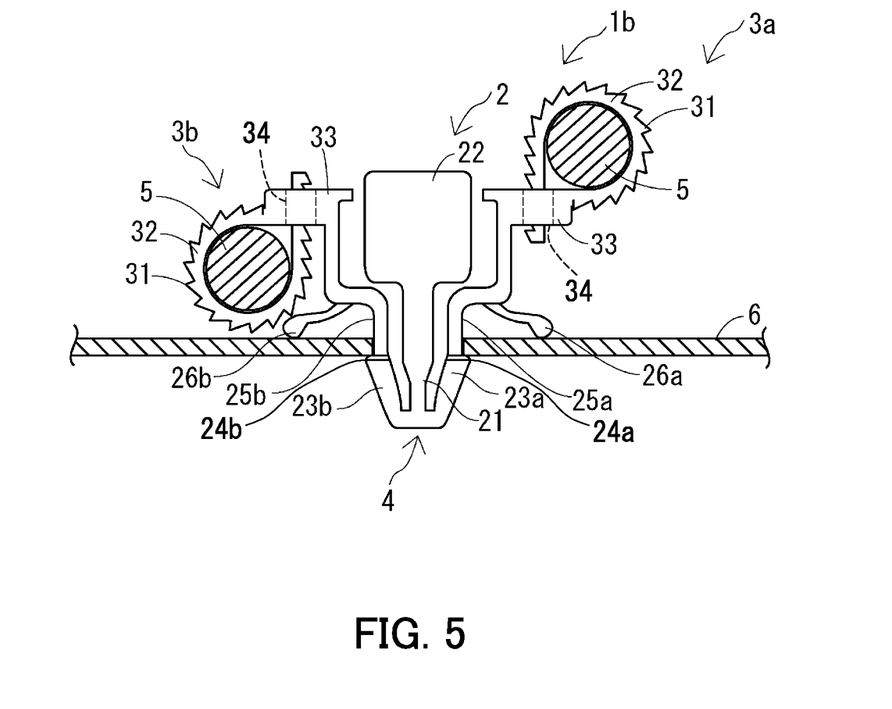
FIG. 5 is a diagram illustrating an example of binding with the fixing cable tie illustrated in FIGS. 4A and 4B.

The following describes a fixing cable tie 1b according to a third embodiment with reference to FIGS. 4A, 4B, and 5. FIG. 4A is a front view of a general configuration of the third embodiment of the fixing cable tie 1b. FIG. 4B is a side view of the general configuration of the third embodiment of the fixing cable tie 1b according to the present disclosure. FIG. 5 is a diagram illustrating an example of binding with the fixing cable tie 1b illustrated in FIGS. 4A and 4B. Referring to FIG. 4A, the fixing cable tie 1b according to the third embodiment differs from the fixing cable tie 1 according to the first embodiment illustrated in FIG. 1A in that the first cable tie section 3a is joined to the joining piece 25a upside down. In other words, the fixing cable tie 1b according to the third embodiment differs from the fixing cable tie 1 according to the first embodiment in that the first cable tie section 3a is joined to the joining piece 25a backwards. That is, the engagement grooves 31 of the tie 32 of the first cable tie section 3a are formed on a surface of the tie 32 near the mounting plate 6. That is, protrusions formed between the engagement grooves 31 differ in a protruding direction between the ties 32. Accordingly, a wrapping direction of electric cable bundles 5 varies between the first cable tie section 3a and the second cable tie section 3b as illustrated in FIG. 5. The tie 32 of the first cable tie section 3a is locked by being inserted downward through the opening 34 of the head section 33 from above the opening 34. The first cable tie section 3a is wrapped such that the engagement grooves 31 do not make contact with the bound electric cable bundle 5 and the engagement grooves 31 are located on an outer surface with respect to the electric cable bundle 5. Accordingly, an electric cable bundle 5 is bound above the head section 33 by the first cable tie section 3a, and an electric cable bundle 5 is bound below the head section 33 by the second cable tie section 3b. Therefore, the electric cable bundles 5 can be bound at varying heights.

As described above, according to an embodiment of the present disclosure, the fixing cable tie 1 binds the electric cable bundles 5 and fixes the electric cable bundles 5 to the mounting plate 6. The fixing cable tie 1 includes the pair of elastic pieces 23a and 23b which serve as the locking section 4 for fixing the fixing cable tie 1 to the mounting plate 6. The elastic pieces 23a and 23b elastically deform inward by external urging (urging force received by the elastic pieces 23a and 23b from outside of the elastic pieces 23a and 23b) to shrink in diameter. Cable ties (the first cable tie section 3a and the second cable tie section 3b) are joined one each to the elastic pieces 23a and 23b.

Through this configuration, electric cables can be divided into two bundles and bound, and the two bound electric cable bundles can be fixed to the mounting plate 6. Because the elastic pieces 23a and 23b can be accessed through the bound electric cables, the attachment/detachment operation to and from the mounting plate 6 can easily be performed. That is, the elastic pieces 23a and 23b can elastically deform such that the elastic pieces 23a and 23b go toward the shaft section 21 by a user urging the electric cable bundles 5 through the ties 32 in a direction in which the electric cable bundles 5 go towards the pushing piece 22. As a result, the attachment/detachment operation to and from the mounting plate 6 can be easily performed.

Additionally, the cable ties (first cable tie section 3a and second cable tie section 3b) according to an embodiment of the present disclosure are respectively joined to either of the pair of joining pieces 25a and 25b such that the wiring direction of the bound electric cable bundles 5 is orthogonal to the Y direction in which the elastic pieces 23a and 23b elastically deform.

Through this configuration, the elastic pieces 23a and 23b can easily elastically deform by operating on the bound electric cable bundles 5. Specifically, the elastic pieces 23a and 23b receive urging force in the Y direction by operating on the electric cable bundles 5 in the direction orthogonal to the wiring direction of the electric cable bundles 5. Accordingly, the elastic pieces 23a and 23b elastically deform easily. As a result, detachment work from the mounting plate 6, which is extraction of the locking section 4 from the fixing hole 61, can be easily performed.

Also, the cable ties (first cable tie section 3a and second cable tie section 3b) according to an embodiment of the present disclosure are joined to the joining pieces 25a and 25b extended upward from the ends of the respective elastic pieces 23a and 23b. The joining pieces 25a and 25b respectively have the contact pieces 26a and 26b that are elastically brought into contact with the obverse surface of the mounting plate 6 in a state where the locking section 4 is attached to the mounting plate 6.

Through this configuration, the fixing cable tie 1 can be securely fixed to the mounting plate 6.

Furthermore, the cable ties (first cable tie section 3a and second cable tie section 3b) according to an embodiment of the present disclosure are joined to the elastic pieces 23a and 23b upside down from each other.

Through this configuration, the electric cable bundles 5 can be bound at varying heights.

Additionally, the fixing cable tie 1 according to an embodiment of the present disclosure includes the shaft section 21 and the pushing piece 22 formed on the upper portion of the shaft section 21. The pair of elastic pieces 23a and 23b are joined to the lower portion of the shaft section 21 so as to be elastically deformable, and arranged so as to flank the shaft section 21 from both sides with a space therebetween.

Through this configuration, the shaft section 21 is not covered from above by the electric cable bundles 5 and is disengaged. As a result, the locking section 4 can be easily pushed into the fixing hole 61 formed in the mounting plate 6 by pushing the pushing piece 22.

Also, the upper surface of the pushing piece 22 according to an embodiment of the present disclosure is formed as the pushing surface 22a perpendicular to the shaft section 21.

Through this configuration, it is possible for an industrial robot with a suction-type hand to handle the fixing cable tie 1.

Furthermore, one or more cable ties (third cable tie section 3c and fourth cable tie section 3d) are joined to the pushing piece 22 according to an embodiment of the present disclosure.

Through this configuration, three or more electric cable bundles 5 can be bound.

Additionally, directions of the cable ties (first cable tie section 3a and second cable tie section 3b) joined to the elastic pieces 23a and 23b and the cable ties (third cable tie section 3c and fourth cable tie section 3d) joined to the pushing piece 22 according to an embodiment of the present disclosure are set according to the respective directions (orthogonal directions) of the intersecting electric cable bundles 5.

Through this configuration, the electric cable bundles 5 can be easily bound and fixed at a point where the electric cable bundles 5 intersect.

It should be noted that the present disclosure is not limited to the above embodiments. It is clear that the embodiments may be appropriately altered within a scope of the technical concept of the present disclosure. Furthermore, the number, position, shape, and the like of constituent elements are not limited to the above embodiment and may be any number, position, shape, or the like suitable for implementing the present disclosure. The same constituent elements are affixed with the same reference signs in the drawings.

What is claimed is:

1. A fixing cable tie for binding electric cables and fixing the electric cables to a mounting plate, the fixing cable tie comprising:
    a pair of elastic pieces serving as a locking section for fixing the electric cables to the mounting plate and configured to elastically deform inward by external urging to shrink in diameter;
    a shaft section joined to the pair of elastic pieces;
    a pushing piece on an upper portion of the shaft section;
    a first pair of cable ties configured to bind the electric cables;
    a second pair of cable ties configured to bind the electric cables;
    a pair of joining pieces configured to join the first pair of cable ties respectively to the pair of elastic pieces; and
    a pair of contact pieces on the pair of joining pieces, wherein
    one of the first pair of cable ties includes a first head section which includes an opening and locks the one of the first pair of cable ties inserted through the opening, another of the first pair of cable ties includes a second head section which includes an opening and locks the other of the first pair of cable ties inserted through the opening,
one of the second pair of cable ties includes a third head section which includes an opening and locks the one of the second pair of cable ties inserted through the opening,
another of the second pair of cable ties includes a fourth head section which includes an opening and locks the other of the second pair of cable ties inserted through the opening,
each of the pair of elastic pieces has a step section,
the pair of contact pieces is elastically brought into contact with an obverse surface of the mounting plate in a state where the locking section is mounted to the mounting plate,
the first head section protrudes from an end of one of the pair of joining pieces in a first direction which is orthogonal to a direction in which the pair of joining pieces extends,
the second head section protrudes from an end of another of the pair of joining pieces in a second direction which is orthogonal to the direction in which the pair of joining pieces extends,
the first direction is opposite to the second direction,
the first pair of cable ties is joined respectively to the pair of elastic pieces such that a wiring direction of the bound electric cables is orthogonal to a direction in which the pair of elastic pieces elastically deforms,
the third head section protrudes from the pushing piece in a third direction which is orthogonal to a direction in which the pair of joining pieces extends,
the fourth head section protrudes from the pushing piece in a fourth direction which is orthogonal to the direction in which the pair of joining pieces extends,
the third direction is opposite to the fourth direction, and
the third direction in which the one of the second pair of cable ties extends and the fourth direction in which the other of the second pair of cable ties extends are respectively orthogonal to the first direction in which the one of the first pair of cable ties extends and the second direction in which the other of the first pair of cable ties extends.

2. The fixing cable tie according to claim 1, wherein
the pair of joining pieces is in contact with each other, and
each of the pair of joining pieces is extended from an end of each of the pair of elastic pieces in a direction away from a point of contact between one of the pair of elastic pieces and another of the pair of elastic pieces.

3. The fixing cable tie according to claim 1, wherein
the first pair of cable ties includes a pair of ties,
each of the pair of ties includes an engagement groove,
the pair of ties are joined respectively to the first head section and the second head section, and
a direction in which the engagement groove on one of the pair of ties protrudes is opposite to a direction in which the engagement groove on another of the pair of ties protrudes.

4. The fixing cable tie according to claim 1, wherein
the pair of elastic pieces is joined to a lower portion of the shaft section so as to be elastically deformable, and is arranged so as to flank the shaft section from both sides with a space therebetween.

5. The fixing cable tie according to claim 1, wherein
an upper surface of the pushing piece serves as a pushing surface that is perpendicular to the shaft section.

6. The fixing cable tie according to claim 1, further comprising
one or more cable ties joined to the pushing piece and configured to bind other electric cables.

7. The fixing cable tie according to claim 6, wherein
the cable ties joined to the elastic pieces and the cable ties joined to the pushing piece are extended in directions according to respective directions of intersecting electric cable bundles to be bound by the cable ties.

8. The fixing cable tie according to claim 1, wherein
the step sections are on respective ends of the pair of elastic pieces,
the pair of elastic pieces is in contact with each other, and
a cross-sectional shape of the locking section gradually expands in diameter from a point of contact between one and another of the pair of elastic pieces and shrinks in diameter at each of the pair of step sections.

* * * * *